(12) United States Patent
Hamamoto et al.

(10) Patent No.: US 9,136,026 B2
(45) Date of Patent: Sep. 15, 2015

(54) REACTOR BOTTOM REPAIRING METHOD

(75) Inventors: Yoshio Hamamoto, Yokohama (JP); Yuuichi Motora, Tokyo (JP); Hiromi Kato, Yokohama (JP); Masahiro Takeuchi, Yokohama (JP); Masataka Tamura, Yokohama (JP); Satoshi Okada, Tokyo (JP); Taiji Kobayashi, Kawasaki (JP); Masaki Yoda, Yokohama (JP); Hiroyuki Miyasaka, Yokohama (JP); Wataru Kono, Yokohama (JP); Masakazu Abura, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 833 days.

(21) Appl. No.: 13/122,330

(22) PCT Filed: Oct. 2, 2009

(86) PCT No.: PCT/JP2009/067270
§ 371 (c)(1),
(2), (4) Date: Jul. 22, 2011

(87) PCT Pub. No.: WO2010/038876
PCT Pub. Date: Apr. 8, 2010

(65) Prior Publication Data
US 2011/0274229 A1 Nov. 10, 2011

(30) Foreign Application Priority Data
Oct. 3, 2008 (JP) ................................ 2008-258981

(51) Int. Cl.
*G21C 13/00* (2006.01)
*G21C 17/017* (2006.01)
(Continued)

(52) U.S. Cl.
CPC ............ *G21C 17/017* (2013.01); *G21C 13/036* (2013.01); *G21C 19/207* (2013.01); *B23K 2201/12* (2013.01); *G21C 17/01* (2013.01); *Y02E 30/40* (2013.01)

(58) Field of Classification Search
USPC ........ 376/203, 260, 291; 29/402.07; 228/119; 219/121.63
See application file for complete search history.

(56) References Cited

U.S. PATENT DOCUMENTS 4,826,217 A * 5/1989 Guerrero .................... 285/141.1
5,066,846 A * 11/1991 Pirl .......................... 219/121.63
(Continued)

FOREIGN PATENT DOCUMENTS

JP  62 263871    11/1987
JP  2001 242280   9/2001
(Continued)

OTHER PUBLICATIONS

International Search Report Issued Nov. 2, 2009 in PCT/JP09/067270 filed Oct. 2, 2009.
(Continued)

*Primary Examiner* — Jack W Keith
*Assistant Examiner* — Sharon M Davis
(74) *Attorney, Agent, or Firm* — Oblon, McClelland, Maier & Neustadt, L.L.P.

(57) ABSTRACT

A heating laser beam is emitted to a cracked portion to remove moisture from the cracked portion, and subsequently, a welding laser beam is emitted to the cracked portion to heat and melt the cracked portion. The heating laser beam and the welding laser beam are emitted to an entire surface of the cylindrical body inside the reactor such as a stub tube penetrating through and fixed to a reactor bottom portion and a crack of the welded portion between the cylindrical body and the reactor bottom portion to thereby prevent a new crack from occurring and reactor water from leaking.

9 Claims, 6 Drawing Sheets

(51) Int. Cl.
  *G21C 13/036*  (2006.01)
  *G21C 19/20*   (2006.01)
  *G21C 17/01*   (2006.01)

(56) References Cited

U.S. PATENT DOCUMENTS

| | | | |
|---|---|---|---|
| 5,227,124 A | | 7/1993 | Saito et al. |
| 5,359,172 A | * | 10/1994 | Kozak et al. ............ 219/121.64 |
| 5,796,797 A | * | 8/1998 | Fallas ........................... 376/260 |
| 5,809,098 A | * | 9/1998 | Deaver ......................... 376/203 |
| 7,206,372 B2 | * | 4/2007 | Willis et al. .................. 376/260 |
| 2009/0135985 A1 | * | 5/2009 | Ono et al. .................... 376/260 |

FOREIGN PATENT DOCUMENTS

| | | |
|---|---|---|
| JP | 2003 320472 | 11/2003 |
| JP | 2008-216012 A | 9/2008 |

OTHER PUBLICATIONS

Extended European Search Report issued May 31, 2013, in European Patent Application No. 09817908.8.
International Preliminary Report on Patentability and Written Opinion issued May 17, 2011, in PCT/JP2009/067270.

* cited by examiner

REACTOR BOTTOM REPAIRING METHOD

TECHNICAL FIELD

The present invention relates to a repairing method of a cylindrical body such as a control rod drive mechanism (hereinafter referred to as "CRD") provided in a reactor bottom of a reactor vessel of a boiling water reactor and a pressurized-water reactor and such as a penetrating (through) tube for a reactor core measuring sensor provided in the reactor bottom of the pressurized-water reactor. The present invention particularly, relates to a reactor bottom repairing method for preventing reactor water from leaking from a crack occurring in a vicinity of a welded portion of the cylindrical body to thereby ensure the repair or maintenance and preventive repair or maintenance for preventing reactor water from leaking in the future.

BACKGROUND ART

Figure 6:
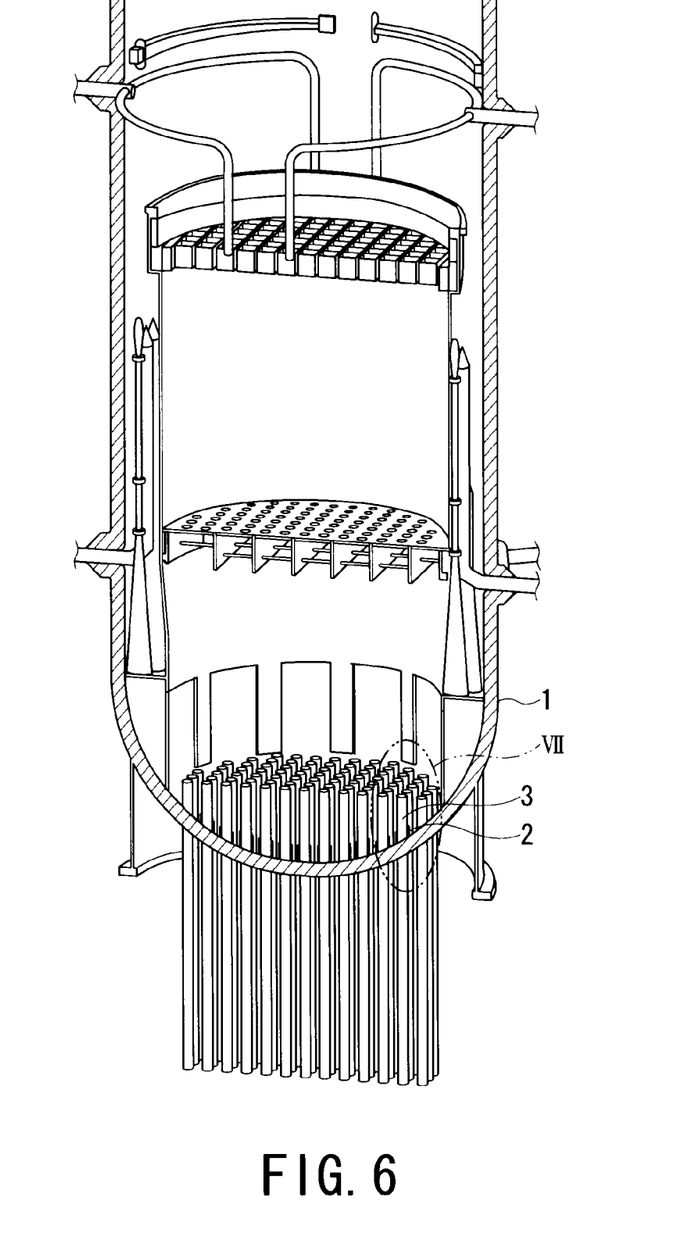
FIG. 6 is a partial sectional view showing a configuration of the boiling water reactor.
Figure 7:
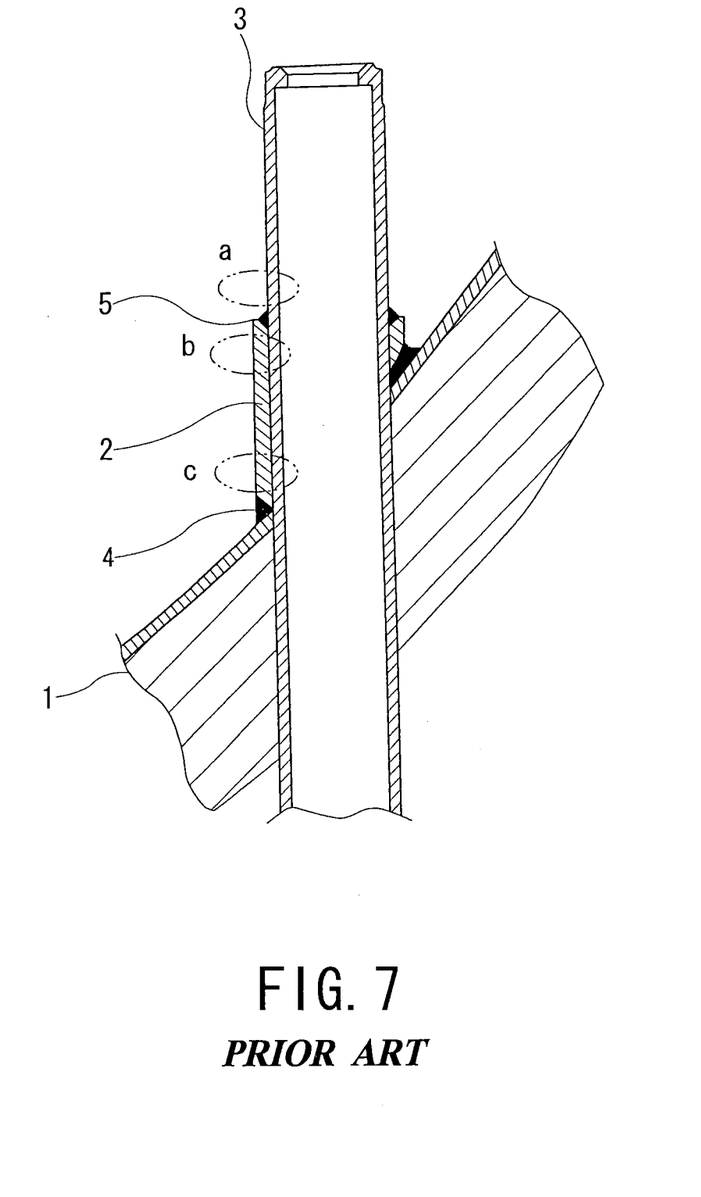
FIG. 7 is an enlarged view of the essential portion of a conventional structure.

FIG. 6 is an enlarged view of a partial cross section illustrating an entire configuration of a boiling water reactor. FIG. 7 is an enlarged sectional view of a reactor bottom portion shown in FIG. 6.

As shown in FIGS. 6 and 7, a CRD housing 3 for storing a CRD and a stub tube 2 for supporting the CRD housing 3 are provided for a bottom head 1 of a reactor pressure vessel in a boiling water reactor.

As illustrated in FIG. 7, the stub tube 2 is welded to a reactor pressure vessel bottom head (or lower-side end plate) (hereinafter simply referred to as a "bottom head") 1 by means of a welded portion 4. The CRD housing 3 passing through the stub tube 2 and the bottom head 1 is welded to an upper portion of the stub tube 2.

Further, as shown in circular portions "a", "b" and "c" of FIG. 7, sensitivity to stress corrosion cracking becomes high particularly in a heat affected portion in a vicinity of the welded portion. It has been reported that in older plants built before knowledge of stress corrosion cracking was available, cracking may occur due to a fault inherent in the welded portion, and as a result reactor water leaks through the cracking.

In a conventional method, when cracking occurs in a stub tube in a penetrating portion of a CRD housing in the reactor bottom portion and a reactor water leakage is detected, a method or treatment replaces an entire CRD housing and stub tube or expands and deforms the tube of the CRD housing from inside by a roller to be pressed against a through hole of the bottom head of the pressure vessel to plug the leakage route. Alternatively, the area with a leak can be enclosed with a cylindrical mechanical seal member.

As the repairing method in a case of a shallow and non-penetrating crack, a method in which a cracked portion is removed by mechanical processing or electrical-discharge machining and then overlay repairing is performed by TIG welding or laser welding, or a welding method for welding only a surface crack, has been studied.

The conventional method of replacing the entire CRD housing and stub tube requires a long time for preparatory and replacement work, resulting in a long time needed for stopping of the operation of the reactor, and hence, highly increasing working cost.

Although the roller tube expansion method is a simple and easy method, re-leakage from a tube expansion portion is likely to occur due to thermal deformation in the operating cycle of the reactor and thus, complete sealing for a long period of time is difficult.

Further, the seal method of attaching a sealing mechanism member is a method only applicable to a limited leak position.

According to the conventional methods (see Patent Documents 1 to 6) in which the cracked portion is removed by mechanical processing or electrical-discharge machining and then overlay repairing is performed by TIG welding or laser welding, there is a high possibility that a new crack occurs due to a flaw of an existing stub tube or a welded portion thereof. It is difficult to perform a particular treatment on this portion and thus the conventional methods are not permanent measures.

Furthermore, in the conventional technology, generation of a crack and the repairing thereof in a cylindrical body such as a penetrating tube for a reactor core measuring sensor provided in the reactor bottom portion of the pressurized-water reactor constitute a significant matter to be solved.

Patent Document 1: Japanese Patent Laid-Open No. H10-030991

Patent Document 2: Japanese Patent Laid-Open No. 2003-320472

Patent Document 3: Japanese Patent Laid-Open No. 2004-226329

Patent Document 4: Japanese Patent Laid-Open No. 2004-294372

Patent Document 5: Japanese Patent Laid-Open No. 2006-337175

Patent Document 6: Japanese Patent Laid-Open No. 2008-020447

DISCLOSURE OF THE INVENTION

Problems to be solved by the Invention

As described above, according to the conventional techniques, since it takes a long period of time to perform preparatory and replacement work, the operation of the reactor is stopped for a long period of time, and high costs for completing the working is involved, and the re-leakage from a tube expansion portion may occur due to thermal deformation in the operating cycle of the reactor. Thus, it is difficult to perform sealing for a long period of time, and furthermore, in the seal method of attaching a sealing mechanism member, the leaking position is limited and a new crack may occur, resulting in not providing a permanent countermeasure.

As a permanent method, although there is provided a method of replacing the entire cylindrical body provided so as to pass through the reactor vessel including the CRD housing and the stub tube, it is difficult to apply such method to a case in which leaking occurs from many portions of the stub tubes.

In view of such circumstances, the present invention has been conceived, and an object of the present invention is to provide a reactor bottom repairing method as a permanent measure against leakage without replacing a cylindrical body provided so as to pass through a reactor vessel including an existing CRD housing and a stub tube.

Means for solving the Problem

In order to achieve the aforementioned object, the present invention provides a reactor bottom portion repairing method, which is a method of sealing a crack occurring on a surface of a cylindrical body passing through and fixed to a reactor bottom portion, the method comprising: emitting a heating laser beam to a cracked part to remove moisture from the cracked part; subsequently emitting a welding laser beam to the cracked part to heat and melt the cracked part; and emitting the heating laser beam and the welding laser beam to a crack of an entire surface of the cylindrical body inside the reactor and a welded portion between the cylindrical body and the reactor bottom portion to thereby prevent a new crack from occurring.

Further, the present invention provides a reactor bottom portion repairing method which is a method of sealing a crack occurring on a surface of a stub tube in a CRD housing penetrating portion in a reactor bottom portion of a reactor pressure vessel of a boiling water reactor, the method comprising: removing moisture from inside the crack by emitting a heating laser beam; subsequently heating and melting the crack by emitting a welding laser beam; and emitting the heating laser beam and the welding laser beam to the entire stub tube and the welded portion between the stub tube and a bottom head to apply overlay welding to the surface with a material having a low stress corrosion cracking sensitivity and to repair the crack on the stub tube surface and the crack on the surface between the bottom head and the welded portion for preventing a new crack from occurring.

Further, the present invention provides a reactor bottom portion repairing method, the method comprising: covering a CRD housing with a cap-shaped member so as to cover from an upper end of the CRD housing up to an upper end surface of the stub tube, the cap-shaped member being made of a material having a shape not interfering with an overlay welded portion at a corner between the CRD housing and the stub tube thereinside, having an outside diameter substantially matching that of the stub tube, and having a low stress corrosion cracking sensitivity; applying laser seal welding to the stub tube in a lower end portion of the member; and applying laser seal welding to a side surface of the CRD housing in an upper portion thereof to thereby prevent reactor water from leaking from the welded portion between the CRD housing and the stub tube and a heat affected portion of the CRD housing.

Effects of the Invention

The present invention emits a heating laser beam to a cracked part on a surface of the cylindrical body provided to pass through the reactor bottom portion to remove moisture from the cracked part; subsequently emits a welding laser beam to the cracked part to heat and melt the cracked part; and emits the heating laser beam and the welding laser beam to an entire surface of the cylindrical body inside the reactor and a crack of the welded portion between the cylindrical body and the reactor bottom portion to thereby prevent a new crack from occurring.

BRIEF DESCRIPTION OF THE DRAWINGS

FIGS. 2 (*a*), (*b*), and (*c*) are explanatory views illustrating a procedure for performing a seal weld to an entire stub tube according to the first embodiment of the present invention.

FIGS. 3 (*a*), (*b*), and (*c*) are explanatory views illustrating further aspects of the present invention.

BEST MODE FOR EMBODYING THE INVENTION

Hereinafter, with reference to the accompanying drawings, the description will focus, according to the present invention, on an embodiment of a preventive repairing or maintenance method of repairing a crack on a surface of a welded portion between a stub tube surface and a bottom head and preventing a new crack from occurring, and on an embodiment of a method of attaching and welding a cap-shaped member for preventing reactor water from leaking even in a case of a crack occurring and penetrating through an overlay welded portion at a corner of a CRD housing or a heat affected portion.

Figure 1:
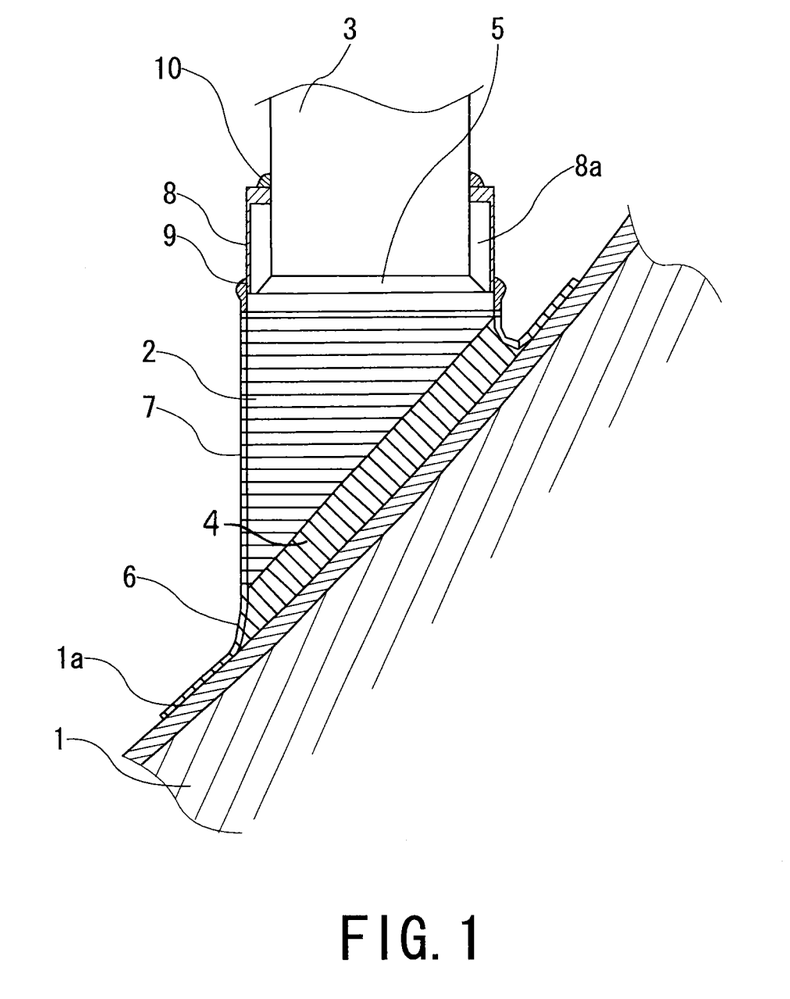
FIG. 1 is an enlarged view of an essential portion of a reactor bottom of a boiling water reactor as well as a CRD housing and a stub tube according to a first embodiment of the present invention.
Figure 2A:
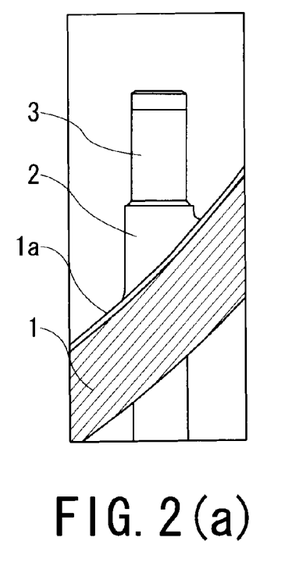
Figure 2B:
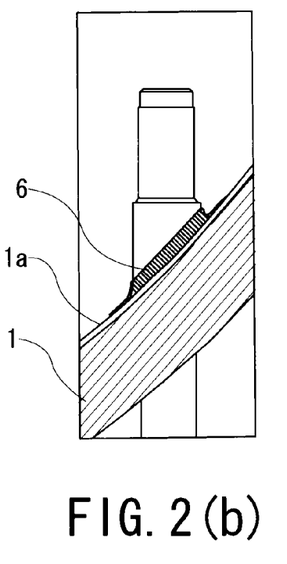
Figure 2C:
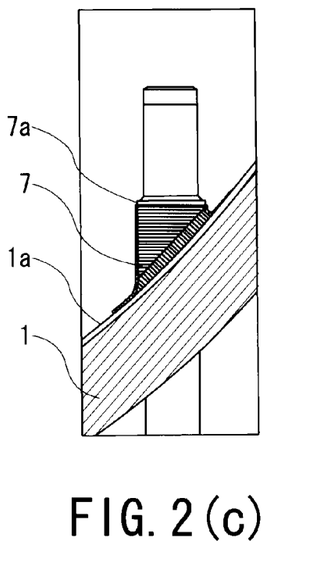

FIG. 1 is an enlarged view of an essential portion for explaining a reactor bottom repairing method according to a first embodiment of the present invention. FIGS. 2 (*a*), (*b*), and (*c*) are views explaining operations for procedure.

This embodiment represents a method of sealing a crack occurring on a surface of a stub tube 2 in a penetrating portion of a CRD housing through a bottom head 1 in a reactor bottom portion of a reactor pressure vessel of a boiling water reactor (BWR).

In this case, a heating laser beam is emitted to remove moisture inside the crack. Then, a welding laser beam is emitted to heat and melt the crack. The heating laser beam and the welding laser beam are emitted to the entire surface of the stub tube 2 and a weld portion (which may be read selectively hereinafter as a portion to be welded or a welded portion) between the stub tube 2 and the bottom head 1 to thereby perform an overlay welding to the surface with a material having a low stress corrosion cracking sensitivity to repair the crack on the surface of the stub tube 2 and the surface of the weld portion between the stub tube 2 and the bottom head 1 for preventing a new crack from occurring.

It is to be noted that the inventors of the subject application have already proposed an apparatus having six control shafts to which the welding method is accessibly applied to around the stub tube.

More specifically, the six control shafts include: a pivot (swivel) shaft of the entire apparatus; an advance shaft for driving a welding torch in a radial direction; a vertical shaft for driving the welding torch in a vertical direction; an inclined drive shaft for driving the welding torch along an inclined angle between an inclined surface of a bottom head and a stub tube; a torch rotating shaft for continuously changing the torch direction from the stub tube side surface up to the bottom head; and a head rotating shaft for correcting the torch position shifted due to the rotation of the inclined drive shaft. In addition, there is provided a mechanism for driving the inclined drive shaft in an arc shape changing with an inclined angle of "0" (zero) on the valley side, a maximum inclined angle at an intermediate portion, and an inclined angle of "0" on the mountain side according to the pivot angle of the entire apparatus so as to follow the welded portion between the stub tube and the bottom head changing three dimensionally therearound.

Hereunder, there will be mentioned a welding method of repairing the crack in the stub tube or preventing a new crack from occurring by using the aforementioned welder to apply overlay welding to a weld portion between the existing surface of the stub tube 2 and the bottom head 1 with a material having a low stress corrosion cracking sensitivity.

As illustrated in FIG. 1, according to the present embodiment, a welded portion 4 is formed by generating a seal weld layer on the weld portion 4 between the surface of the stub tube 2 and the bottom head 1.

Then, as illustrated in FIGS. 2 (a), (b), and (c), there is executed a method of preventing reactor water from leaking from a crack formed in a welding heat affected portion.

First, a heating and welding laser beam welder is used to apply a seal weld 6 to the weld portion 4 between (FIG. 1) the bottom head and the lower portion of the stub tube 2 along an inclined portion of the bottom head 1.

In this case, the welder has a structure in which the attachment opening of the laser fiber is located on the mountain side to protect the interference with the bottom head 1. Thus, an apparatus performing different handlings depending on the left or right direction is used to weld an inclined portion on the right side and an inclined portion on the left side. Further, a cladding layer 1a is formed on an inner surface of the bottom head 1.

Then, a heating and welding laser beam welder is used to apply a seal weld 7 horizontally to a side surface portion of the stub tube 2 for performing a filling process. At this time, a way how to use and handle the welder is not particularly limited.

The upper end portion of the stub tube is angled, and thus, the filler metal position cannot be fixed. Therefore, though slightly, a non-weldable portion 7a will remain.

Considering the dilution with the existing base material or weld metal, the seal weld layers 6 and 7 are made of three layers with a thickness of approximately 3 mm, but the seal weld layer may consist of one layer simply for the purpose of plugging the leak portion.

Further, in a general welding method, there occurs an event of emitting water moisture remaining in a crack, whereas in the welding method mentioned above, it becomes possible to perform a sound seal weld layer without a pit due to the moisture emitting event.

Figure 3A:
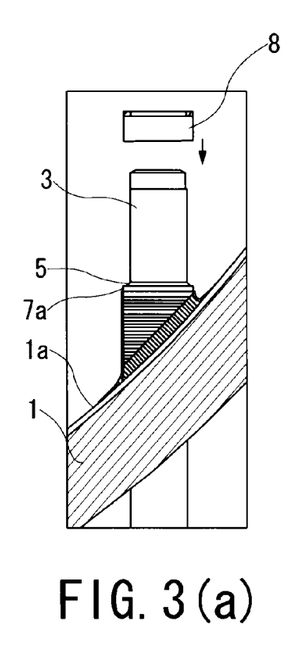
Figure 3B:
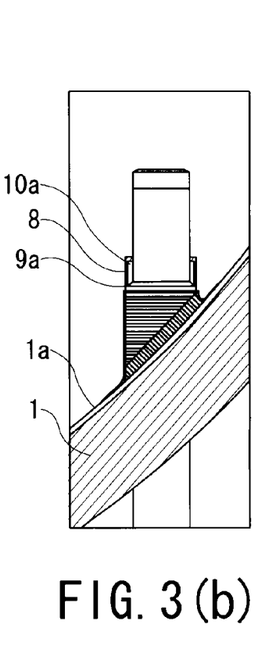
Figure 3C:
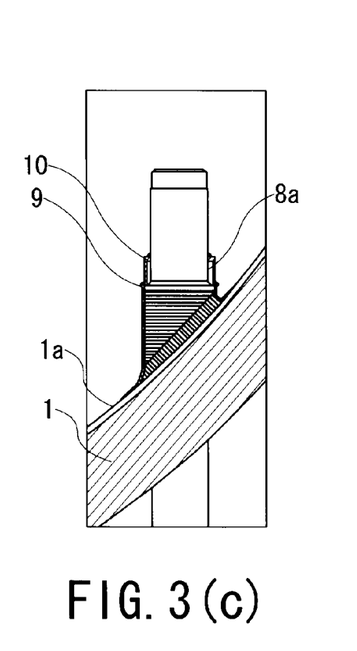

FIGS. 3 (a), (b), and (c) are views showing further aspects of the present invention, and more specifically, these views show a method including procedures and operations for applying a seal weld in a state covered with a cap-shaped member 8 to thereby prevent reactor water from leaking through a crack in a welded portion 5 between the CRD housing and the stub tube and the heat affected portion of the CRD housing shown in FIG. 1.

FIGS. 3 (a), (b), and (c) represent procedures following the generation of the seal weld layers 6 and 7 on the weld portion between the surface of the stub tube 2 and the bottom head 1 according to the first embodiment shown in FIG. 2.

First, as illustrated in FIG. 3(a), the CRD housing 3 is covered with a cap-shaped member 8 so as to cover the CRD housing 3 from an upper end of the CRD housing up to an upper end surface of the stub tube. The cap-shaped member 8 is made of a material having a shape not interfering with an overlay welded portion 5 at a corner between the CRD housing 3 and the stub tube 2 (which is behind the seal weld layer 7), having an outer diameter substantially matching with that of the stub tube 2, and having a low stress corrosion cracking sensitivity.

Then, as illustrated in FIG. 3(b), spot laser welding is applied to the stub tube 2 so as not to move the lower end of the cap-shaped member 8 by applying the laser seal welding 9 to the stub tube and the lower end portion of the cap-shaped member 8 including the non-welded portion 7a in the upper portion of the stub tube 2 not welded in the first embodiment. At this time, preceding the application of the welding beam, an inert gas is sprayed over the welding surface to remove moisture in a gap 9a between the lower surface of the cap-shaped member 8 and the upper end surface of the stub tube, thereby providing a sound seal welded portion 9 without a pit due to the moisture emitting event by suppressing water evaporation.

Finally, as illustrated in FIG. 3(c), welding is applied to a laser seal weld portion 10 between the upper portion of the cap-shaped member 8 and the side surface of the CRD housing 3. At this time, in advance of applying the welding beam, an inert gas is sprayed over the weld portion of the CRD housing to a lower water level of an inner portion 8a of the cap-shaped member. The moisture is thereby removed from the melt portion and the moisture emitting event is prevented.

In the above procedure, although the unremoved moisture and inert gas remain in the inner portion 8a of the cap-shaped member, but that does not cause a problem.

According to the present embodiment, the welded portion between the stub tube and the bottom head 1 is welded as the seal welded portion 6, and the side surface of the stub tube is welded as the seal welded portion 7. Subsequently, the cap-shaped member 8 covering the welded portion between the CRD housing and the stub tube is joined by the seal welded portion "10" welded to the CRD housing and the seal welded portion 9 welded to the upper portion of the stub tube.

According to the present embodiment, there is provided a preventive repairing method comprising: covering a CRD housing with a cap-shaped member so as to cover the CRD housing from an upper end thereof up to an upper end surface of the stub tube, the cap-shaped member being made of a material having a shape not interfering with an overlay welded portion at a corner between the CRD housing and the stub tube thereinside, having an outside diameter substantially matching that of the stub tube, and having a low stress corrosion cracking sensitivity; applying laser seal welding to the stub tube in a lower end portion of the member; and applying laser seal welding to a side surface of the CRD housing in an upper portion thereof to thereby prevent reactor water from leaking even in a case of a crack occurring and penetrating through an overlay welded portion at a corner between the CRD housing and the stub tube or a heat affected portion of the CRD housing.

Figure 4:
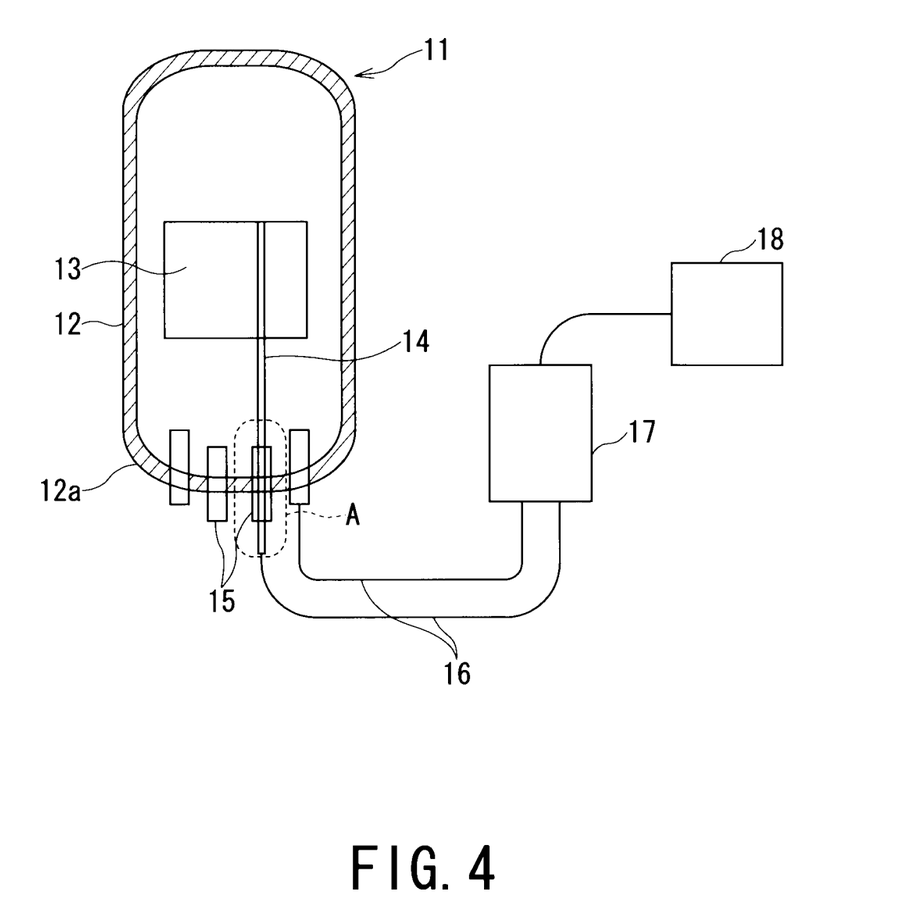
FIG. 4 illustrates an example of a pressurized-water reactor according to further aspects of the present invention and is a view for explaining a penetrating tube portion for an instrument tube provided in a reactor bottom portion.
Figure 5:
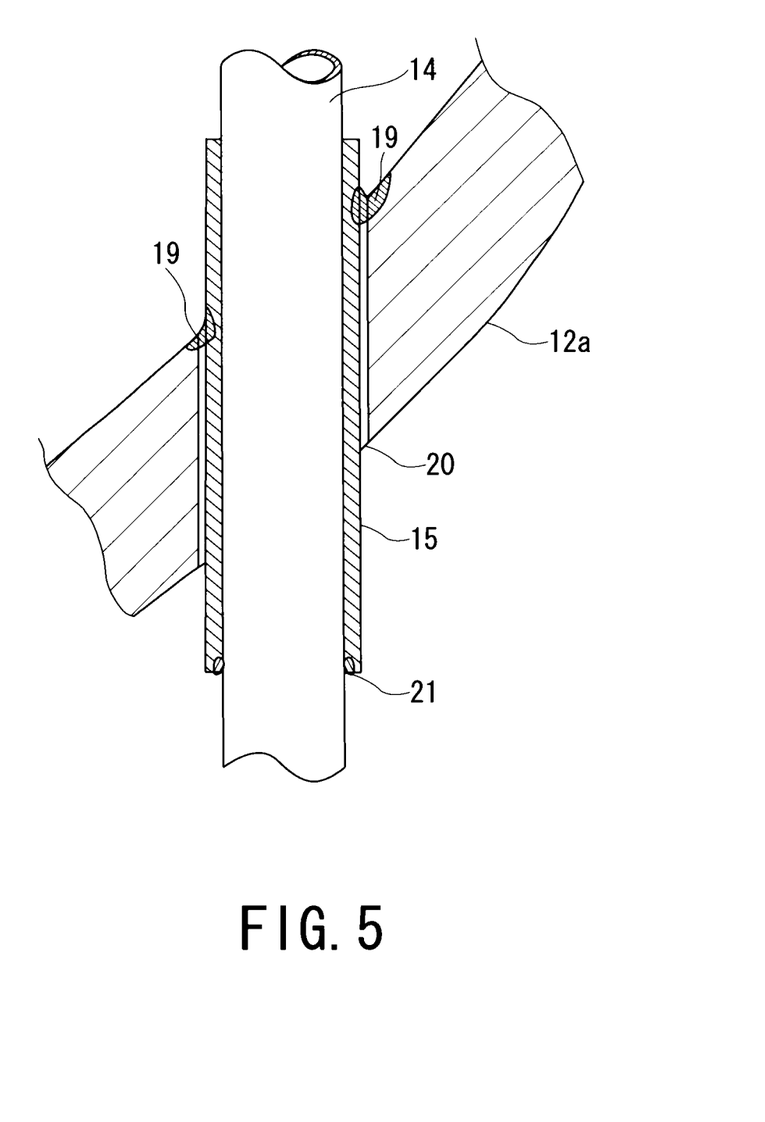
FIG. 5 is an enlarged view of the portion "A" illustrated in FIG. 4 illustrating a seal welded portion.

FIGS. 4 and 5 illustrate an example of a pressurized-water reactor (PWR) according to further aspects of the present application.

FIG. 4 is a longitudinal sectional view illustrating the entire configuration of a reactor vessel 12 of a pressurized-water reactor 11. As illustrated in FIG. 4, a reactor core 13 is provided inside the reactor vessel 12. An instrumentation tube 14 extends downward from the reactor core 13. The instrumentation tube 14 passes through a plurality of penetrating tubes 15 provided in a reactor bottom portion 12a and extends outside the reactor bottom portion. In other word, the instrumentation tube 14 extends from the lower portion of the reactor core 13, passing through inside the penetrating tube 15, and reaches an upper portion of the reactor core 13 in which a nuclear fission reaction occurs. An unillustrated moving sensor is inserted into the instrumentation tube 14 to obtain a combustion state of the reactor core 13.

Each penetrating tube 15 is connected to a measuring drive apparatus 17 through a wiring 16, and a measurement signal from a sensor is measured by the measuring drive apparatus 17 provided outside the reactor vessel 12 and then transferred to a control panel 18 so as to be used for reactor operation.

FIG. 5 is an enlarged longitudinal sectional view of the penetrating tube 15 in the bottom portion (shown with the capital "A") of the reactor vessel 12 shown in FIG. 4.

As illustrated in FIG. 5, the penetrating tube 15 is provided so as to pass through a bottom portion 12a of the reactor vessel 12. The penetrating tube 15 holding the instrumentation tube 14 vertically passes through a hole 20 of the reactor bottom portion 12a and is welded to an inner surface of the reactor bottom portion 12a. Further, a seal 21 is interposed between the instrumentation tube 14 and the penetrating tube 15. The seal 21 prevents water from leaking from inside the reactor.

Thus, according to the present embodiment, the instrumentation tube 14 is held inside the penetrating tube 15 which is a cylindrical body penetrating through and fixed to the reactor bottom portion 12a.

More specifically, a heating laser beam is emitted to a cracked portion of the penetrating tube 15 to remove moisture from inside the crack. Then, a welding laser beam is emitted to the cracked portion to heat and melt the cracked portion (welded portion 19).

In the welded portion 19, the heating laser beam and the welding laser beam are emitted to a crack on the entire surface of the penetrating tube 15 inside the reactor and the welded portion 19 between the penetrating tube 15 and the reactor bottom portion 12a.

The method mentioned hereinabove allows the cracked portion to be heated and melted by welding laser beam irradiation, and effectively prevents a new crack from occurring.

DESCRIPTION OF REFERENCE NUMERALS

1 . . . reactor pressure vessel bottom head,
1a . . . cladding layer in inner surface of bottom head,
2 . . . stub tube,
3 . . . CRD housing,
4 . . . welded portion between stub tube and bottom head,
5 . . . welded portion between stub tube and CRD housing,
6 . . . seal weld portion between stub tube and bottom head,
7 . . . seal welded portion welded to side surface of stub tube,
7a . . . portion not seal-welded to side surface of stub tube,
8 . . . cap-shaped member,
8a . . . space enclosed with cap-shaped member,
9 . . . seal weld portion between cap-shaped member and upper portion of stub tube,
9a . . . gap between cap-shaped member and upper portion of stub tube,
10 . . . seal weld portion between cap-shaped member and CRD housing,
11 . . . pressurized water reactor,
12 . . . reactor vessel,
12a . . . bottom portion of the reactor vessel,
13 . . . reactor core,
14 . . . instrumentation tube,
15 . . . penetrating tube,
16 . . . wiring,
17 . . . measuring drive apparatus,
18 . . . control panel,
19 . . . welded portion,
21 . . . seal

The invention claimed is:

1. A reactor bottom repairing method of sealing a crack occurring on a surface of a cylindrical body penetrating through a lower end portion of a reactor bottom portion and fixed to the reactor bottom portion by using a welding torch, the reactor bottom portion including an inclined surface inclined relative to the cylindrical body, the method comprising:

providing an apparatus for driving a welding torch, the apparatus including six control shafts including a pivot shaft for entirely pivoting the apparatus, an advance shaft for driving the welding torch in a radial direction, a vertical shaft for driving the welding torch in a vertical direction, an inclined drive shaft for driving the welding torch along an inclined angle between an inclined surface of a bottom head and the cylindrical body, a torch rotating shaft for continuously changing a torch direction from the cylindrical body side surface up to a bottom head, and a head rotating shaft for correcting a torch position shifted due to rotation of the inclined drive shaft;

emitting a first heating laser beam to a cracked portion to remove moisture from the cracked portion;

driving the welding torch by the apparatus including the six control shafts along the inclined surface of the lower end portion of the reactor bottom portion and the cylindrical body, and while driving the welding torch changing a direction of the welding torch from a side surface of the cylindrical body to the lower end portion of the reactor bottom surface;

emitting from the welding torch a first welding laser beam following a portion to be welded to the lower end portion of the reactor bottom portion to form a welded portion, a position of the welding laser beam changing to follow the portion to be welded by a welding machine correcting a position of the welding torch shifted by rotation of a drive shaft of the welding torch; and emitting a second heating laser beam and a second welding laser beam to an entire surface of the cylindrical body inside the reactor and the welded portion between the cylindrical body and the lower end portion of the reactor bottom portion thereby preventing a new crack from occurring.

2. The reactor bottom repairing method of preventing leakage of reactor water according to claim 1, further comprising:

covering a control rod drive (CRD) housing with a cap-shaped member to cover the CRD housing from an upper end thereof up to an upper end surface of the cylindrical body, the cap-shaped member being made of a material having a shape not interfering with an overlay welded portion at a corner between the CRD housing and the cylindrical body thereinside, having an outside diameter substantially matching with that of the cylindrical body, and having a low stress corrosion cracking sensitivity;

applying first laser seal welding to the cylindrical body in a lower end portion of the member;

and applying second laser seal welding to a side surface of the CRD housing in an upper portion thereof to thereby prevent reactor water from leaking from a welded portion between the CRD housing and the cylindrical body and a heat affected portion of the CRD housing.

3. The reactor bottom repairing method, according to claim 2, further comprising applying third laser seal welding between a lower end portion of the cap-shaped member and the cylindrical body, wherein preceding emitting the welding beam, an inert gas is sprayed to remove moisture from the melt portion to thereby prevent a moisture emitting at a welding period.

4. The reactor bottom repairing method, according to claim 2, further comprising applying third laser seal welding between an upper end portion of the cap-shaped member and the CRD housing, wherein preceding the welding beam radiation, an inert gas is sprayed to lower a water level of an inner portion of the cap-shaped member and to remove moisture from the melt portion to thereby prevent a moisture emitting event.

5. A reactor bottom repairing method of sealing a crack occurring on a surface of a stub tube of a penetrating portion of a control rod drive (CRD) housing of a lower end portion of a reactor bottom portion by using a welding torch, the reactor bottom portion including an inclined surface inclined relative to the stub tube, the method comprising:

providing an apparatus for driving a welding torch, the apparatus including six control shafts including a pivot shaft for entirely pivoting the apparatus, an advance shaft for driving the welding torch in a radial direction, a vertical shaft for driving the welding torch in a vertical direction, an inclined drive shaft for driving the welding torch along an inclined angle between an inclined surface of a bottom head and a stub tube, a torch rotating shaft for continuously changing a torch direction from a stub tube side surface up to a bottom head, and a head rotating shaft for correcting the torch position shifted due to rotation of the inclined drive shaft;

emitting a first heating laser beam to a cracked portion to remove moisture from the cracked portion;

driving the welding torch by the apparatus including the six control shafts along the inclined surface of the lower end portion of the reactor bottom portion and the stub tube, and while driving the welding torch changing a direction of the welding torch from a side surface of the stub tube to the lower end portion of the reactor bottom surface;

emitting from the welding torch a first welding laser beam following a portion to be welded to the lower end portion of the reactor bottom portion to form a welded portion, a position of the welding laser beam changing to follow the portion to be welded by a welding machine correcting a position of the welding torch shifted by rotation of a drive shaft of the welding torch; and emitting a second heating laser beam and a second welding laser beam to an entire surface of the stub tube and the welded portion between the stub tube and a bottom head to weld the surface of the stub tube to repair the crack on the stub tube surface and the crack on the surface between the lower end portion of the bottom head and the welded portion thereby preventing a new crack from occurring.

6. The reactor bottom repairing method of preventing leakage of reactor water according to claim 5, further comprising:

covering the CRD housing with a cap-shaped member to cover the CRD housing from an upper end thereof up to an upper end surface of the stub tube, the cap-shaped member being made of a material having a shape not interfering with an overlay welded portion at a corner between the CRD housing and the stub tube thereinside, having an outside diameter substantially matching with that of the stub tube, and having a low stress corrosion cracking sensitivity;

applying first laser seal welding to the stub tube in a lower end portion of the member; and applying second laser seal welding to a side surface of the CRD housing in an upper portion thereof to thereby prevent reactor water from leaking from a welded portion between the CRD housing and the stub tube and a heat affected portion of the CRD housing.

7. The reactor bottom repairing method, according to claim 6, further comprising applying third laser seal welding between a lower end portion of the cap-shaped member and the stub tube, wherein preceding emitting the welding beam, an inert gas is sprayed to remove moisture from the melt portion to thereby prevent a moisture emitting at a welding period.

8. The reactor bottom repairing method, according to claim 6, further comprising applying third laser seal welding between an upper end portion of the cap-shaped member and the CRD housing, wherein preceding the welding beam radiation, an inert gas is sprayed to lower a water level of an inner portion of the cap-shaped member and to remove moisture from the melt portion to thereby prevent a moisture emitting event.

9. A reactor bottom repairing method of repairing a crack in a penetrating portion of a control rod drive (CRD) housing and a stub tube portion and preventing reactor water from leaking by a combination of an overlay welding of an entire surface of the stub tube and a surface of the welded portion of a lower end portion of a reactor bottom surface and a welding of a cap-shaped member to cover a welded portion between the CRD housing and the stub tube by using a welding torch, the reactor bottom portion including an inclined surface inclined relative to the stub tube:

the overlay welding comprising:

providing an apparatus for driving a welding torch, the apparatus including six control shafts including a pivot shaft for entirely pivoting the apparatus, an advance shaft for driving the welding torch in a radial direction, a vertical shaft for driving the welding torch in a vertical direction, an inclined drive shaft for driving the welding torch along an inclined angle between an inclined surface of a bottom head and a stub tube, a torch rotating shaft for continuously changing a torch direction from a stub tube side surface up to a bottom head, and a head rotating shaft for correcting the torch position shifted due to rotation of the inclined drive shaft;

emitting a first heating laser beam to a cracked portion to remove moisture from the cracked portion;

driving the welding torch by the apparatus including the six control shafts along the inclined surface of the lower end portion of the reactor bottom portion and the CRD housing, and while driving the welding torch changing a direction of the welding torch from a side surface of the CRD housing to the lower end portion of the reactor bottom surface;

emitting from the welding torch a first welding laser beam following a portion to be welded to the lower end portion of the reactor bottom portion to form a welded portion, a position of the welding laser beam changing to follow the portion to be welded by a welding machine correcting a position of the welding torch shifted by rotation of a drive shaft of the welding torch; and emitting a second heating laser beam and a second welding laser beam to an entire surface of the cylindrical body inside the reactor and the welded portion between the cylindrical body and the lower end portion of the reactor bottom portion thereby preventing a new crack from occurring;

the welding for the cap-shaped member comprising:

covering the CRD housing with a cap-shaped member to cover the CRD housing from an upper end thereof up to an upper end surface of the stub tube, the cap-shaped member being made of a material having a shape not interfering with an overlay welded portion at a corner between the CRD housing and the stub tube thereinside, having an outside diameter substantially matching with that of the stub tube, and having a low stress corrosion cracking sensitivity;

applying first laser seal welding to the stub tube in a lower end portion of the member; and applying second laser seal welding to a side surface of the CRD housing in an upper portion thereof to thereby prevent reactor water from leaking from a welded portion between the CRD housing and the stub tube and a heat affected portion of the CRD housing.

\* \* \* \* \*